United States Patent
Chen et al.

(10) Patent No.: US 12,148,194 B2
(45) Date of Patent: Nov. 19, 2024

(54) METHOD, DEVICE, AND STORAGE MEDIUM FOR TARGETED ADVERSARIAL DISCRIMINATIVE DOMAIN ADAPTATION

(71) Applicant: Intelligent Fusion Technology, Inc., Germantown, MD (US)

(72) Inventors: Hua-mei Chen, Germantown, MD (US); Ashley Diehl, Dayton, OH (US); Erik Blasch, Arlington, VA (US); Genshe Chen, Germantown, MD (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 481 days.

(21) Appl. No.: 17/474,516

(22) Filed: Sep. 14, 2021

(65) Prior Publication Data

US 2024/0185555 A1    Jun. 6, 2024

Related U.S. Application Data

(60) Provisional application No. 63/080,291, filed on Sep. 18, 2020, provisional application No. 63/078,073, filed on Sep. 14, 2020.

(51) Int. Cl.
*G06V 10/44* (2022.01)
*G06V 10/764* (2022.01)

(52) U.S. Cl.
CPC ............ *G06V 10/44* (2022.01); *G06V 10/764* (2022.01)

(58) Field of Classification Search
None
See application file for complete search history.

(56) References Cited

U.S. PATENT DOCUMENTS

| | | | |
|---|---|---|---|
| 11,645,361 B2* | 5/2023 | Kim | G06N 3/08 |
| | | | 382/159 |
| 2017/0200065 A1* | 7/2017 | Wang | G06V 10/764 |
| 2019/0147304 A1* | 5/2019 | Liu | G06F 18/2148 |
| | | | 382/157 |
| 2020/0134316 A1* | 4/2020 | Krishnamurthy | G06V 20/70 |
| 2021/0110534 A1* | 4/2021 | Yu | G06V 10/764 |
| 2022/0076374 A1* | 3/2022 | Li | G06T 3/10 |
| 2022/0092420 A1* | 3/2022 | Lu | G06N 3/088 |

(Continued)

*Primary Examiner* — Akwasi M Sarpong
*Assistant Examiner* — Pawan Dhingra
(74) *Attorney, Agent, or Firm* — ANOVA LAW GROUP, PLLC

(57) ABSTRACT

Embodiments of the present disclosure provide a method, a device, and a storage medium for targeted adversarial discriminative domain adaptation (T-ADDA). The method includes pre-training a source model including a source feature encoder and a source classifier, adapting a target feature encoder, and generating a target model by concatenating the adapted target feature encoder with the pre-trained source classifier. Adapting the target feature encoder includes configuring the pre-trained source feature encoder to be an initial target feature encoder for generating target feature vectors in each target class; adjusting a domain discriminator according to an adversarial domain discrimination loss; adjusting the initial target feature encoder according to a generative adversarial network (GAN) loss; and further adjusting the initial target feature encoder to generate the target feature encoder according to a feature class matching loss using labeled target feature vectors and corresponding source feature class centers.

15 Claims, 8 Drawing Sheets

(56) References Cited

U.S. PATENT DOCUMENTS

| | | | |
|---|---|---|---|
| 2022/0129705 A1* | 4/2022 | Kim | G06V 10/454 |
| 2023/0259553 A1* | 8/2023 | Krishnamurthy | G06V 20/20 |
| | | | 706/20 |
| 2023/0289955 A1* | 9/2023 | Xie | G06T 7/0012 |

* cited by examiner

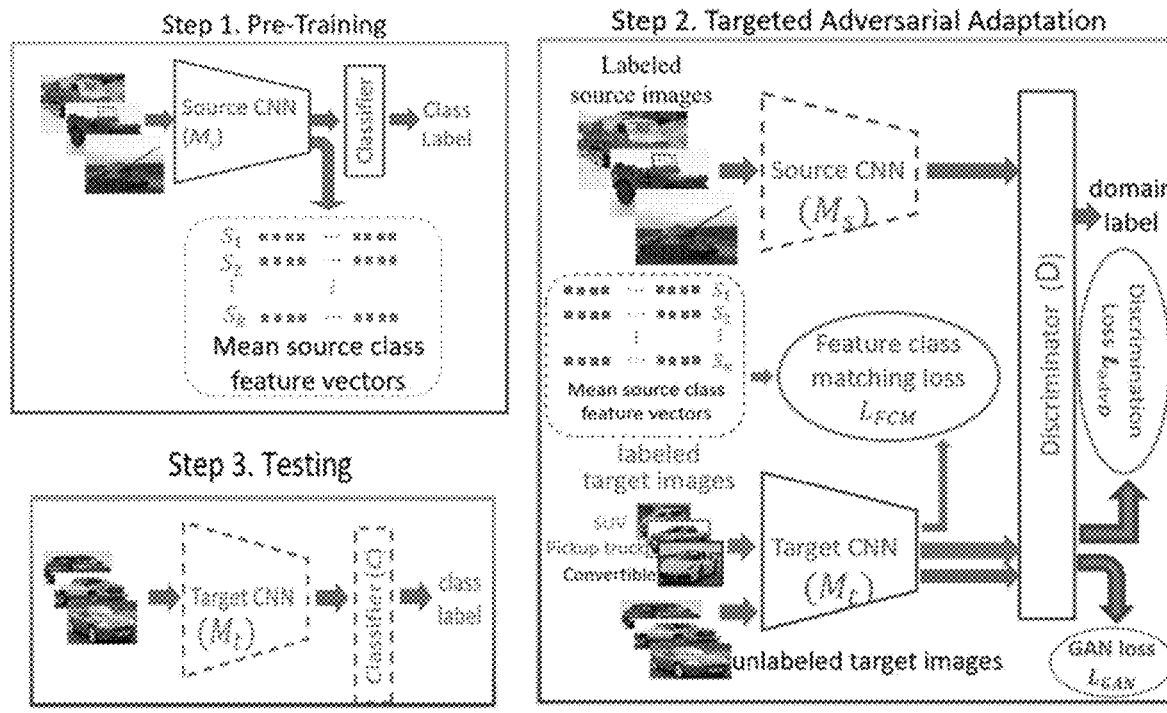
FIG. 4
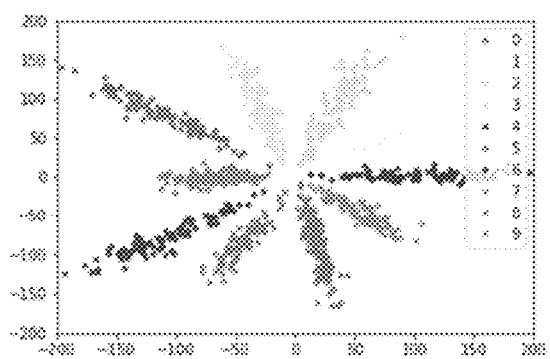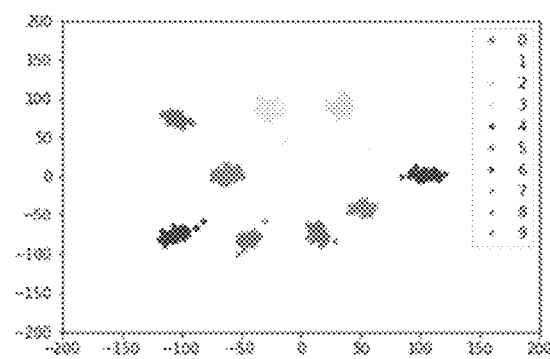
FIG. 5A              FIG. 5B

Given source domain data X_source, source class centers sourceCenters, unlabeled target domain data Y_target_unlabeld, labeled target domain data Y_target_labeled, as well as the following neural networks *sourceEncoder*, *targetEncoder*, *discriminator*, *gan*, and *fcm*. The loss functions employed by *discriminator*, *gan*, and *fcm* are eq.(4), eq.(5) and eq.(6) respectively. Denote Y_target the union of Y_target_unlabeld and Y_target_labeled.

```
for epoch = 1 to epoch_max
    for batch = 1 to batch_max
        sourceFeatures = sourceEncoder(X_source)
        targetFeature = targetEncoder(Y_target)
        discriminator.train_on_batch([sourceFeatures, targetFeature],
                                     disc_y=[1,...,1,0,...,0])
        gan.train_on_batch(Y_target, gen_y=[1,...,1])
        fcm.train_on_batch([Y_target_labeled, sourceCenters], [dummy_y, dummy_y])
    end_batch
end_epoch
```

FIG. 6

| Layer (type) | Output Shape | Param # |
|---|---|---|
| dense_1 (Dense) | (None, 1024) | 263168 |
| leaky_re_lu_1 (LeakyReLU) | (None, 1024) | 0 |
| dense_2 (Dense) | (None, 512) | 524800 |
| leaky_re_lu_2 (LeakyReLU) | (None, 512) | 0 |
| dense_3 (Dense) | (None, 1) | 513 |

FIG. 7

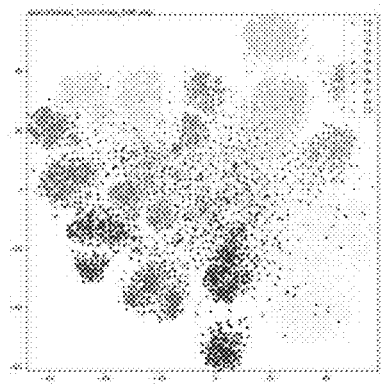 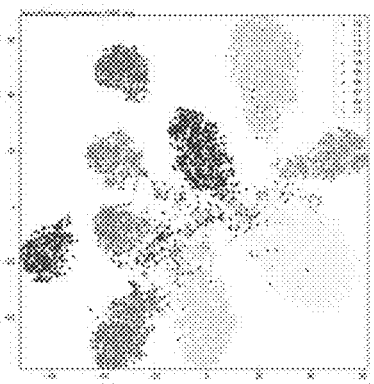 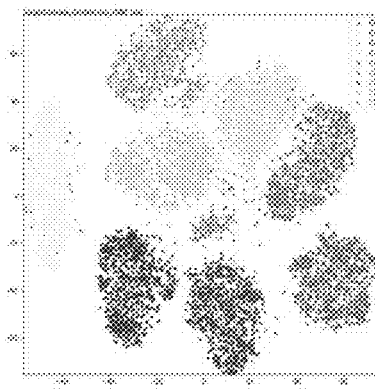
FIG. 10A     FIG. 10B     FIG. 10C
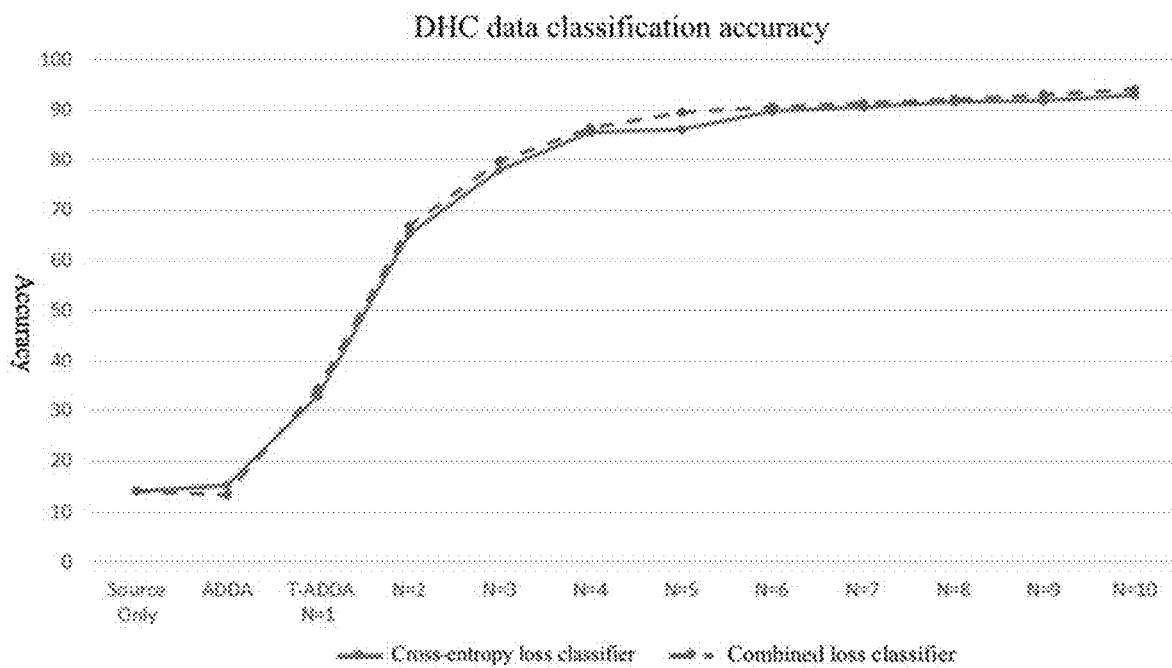
FIG. 11

METHOD, DEVICE, AND STORAGE MEDIUM FOR TARGETED ADVERSARIAL DISCRIMINATIVE DOMAIN ADAPTATION

CROSS-REFERENCE TO RELATED APPLICATIONS

This application claims the priority of U.S. Provisional Application No. 63/078,073, filed on Sep. 14, 2020, and No. 63/080,291, filed on Sep. 18, 2020, the content of all of which is incorporated herein by reference in its entirety.

GOVERNMENT RIGHTS

The present disclosure was made with Government support under Contract No. FA864920P0352, awarded by the United States Air Force Research Laboratory. The U.S. Government has certain rights in the present disclosure.

FIELD OF THE DISCLOSURE

The present disclosure generally relates to the field of domain adaptation technology and, more particularly, relates to a method, a device, and a storage medium for targeted adversarial discriminative domain adaptation.

BACKGROUND

Deep convolutional neural networks (CNNs) trained on large datasets have demonstrated excellent performance on various computer vision tasks. However, the data distribution in the target domain used for testing may be different from the data distribution in the source domain used for training. Domain adaptation (DA) is a technology enabling aided target recognition (AiTR) and other approaches for environments and targets where data or labeled data is scarce. DA aims to overcome the domain shift or dataset bias that reduces classifier performance when classification is performed in the target domain. The shift in the data distribution may be due to differences in illumination, sensor type, perspective, background, or target class, and the like. Conventional transfer learning may utilize pre-trained CNN models for feature extraction and perform fine-tuning for training on a labeled dataset of interest. Unsupervised DA may process unlabeled data in the target domain after training with labeled data in source domain. Various unsupervised DA approaches have demonstrated desirable performance, but only when the domain shift is small. For applications such as transferring knowledge from one set of targets to another set of targets, unsupervised DA approaches may fail as the class correspondence is ambiguous without further information, and may not know how the adaptation should be proceeded. Therefore, there is a need to develop a new domain adaptation method which may provide required robustness for scenarios where the domain shift is large.

BRIEF SUMMARY OF THE DISCLOSURE

One aspect or embodiment of the present disclosure provides a targeted adversarial discriminative domain adaptation (T-ADDA) method. The method includes pre-training a source model, including a source feature encoder and a source classifier, on a source domain image dataset according to combined cross-entropy loss and center loss functions, where source feature vectors in each source class are generated; further includes adapting a target feature encoder by: configuring the pre-trained source feature encoder of the pre-trained source model to be an initial target feature encoder, and using the initial target feature encoder to generate target feature vectors in each target class based on a target domain image dataset; adjusting a domain discriminator according to an adversarial domain discrimination loss using the source feature vectors in each source class and the target feature vectors in each target class; adjusting the initial target feature encoder according to a generative adversarial network (GAN) loss using the target feature vectors in each target class and the adjusted domain discriminator; and further adjusting the initial target feature encoder to generate the target feature encoder according to a feature class matching loss using labeled target feature vectors and corresponding source feature class centers; and further includes generating a target model by concatenating the adapted target feature encoder with the pre-trained source classifier of the pre-trained source model.

Another aspect or embodiment of the present disclosure provides a targeted adversarial discriminative domain adaptation (T-ADDA) device. The device includes a memory, configured to store program instructions for performing a T-ADDA method; and a processor, coupled with the memory and, when executing the program instructions, configured for: pre-training a source model, including a source feature encoder and a source classifier, on a source domain image dataset according to combined cross-entropy loss and center loss functions, where source feature vectors in each source class are generated; adapting a target feature encoder by: configuring the pre-trained source feature encoder of the pre-trained source model to be an initial target feature encoder, and using the initial target feature encoder to generate target feature vectors in each target class based on a target domain image dataset; adjusting a domain discriminator according to an adversarial domain discrimination loss using the source feature vectors in each source class and the target feature vectors in each target class; adjusting the initial target feature encoder according to a generative adversarial network (GAN) loss using the target feature vectors in each target class and the adjusted domain discriminator; and further adjusting the initial target feature encoder to generate the target feature encoder according to a feature class matching loss using labeled target feature vectors and corresponding source feature class centers; and generating a target model by concatenating the adapted target feature encoder with the pre-trained source classifier of the pre-trained source model.

Another aspect or embodiment of the present disclosure provides a non-transitory computer-readable storage medium, containing program instructions for, when being executed by a processor, performing a targeted adversarial discriminative domain adaptation (T-ADDA) method, the method including: pre-training a source model, including a source feature encoder and a source classifier, on a source domain image dataset according to combined cross-entropy loss and center loss functions, where source feature vectors in each source class are generated; adapting a target feature encoder by: configuring the pre-trained source feature encoder of the pre-trained source model to be an initial target feature encoder, and using the initial target feature encoder to generate target feature vectors in each target class based on a target domain image dataset; adjusting a domain discriminator according to an adversarial domain discrimination loss using the source feature vectors in each source class and the target feature vectors in each target class; adjusting the initial target feature encoder according to a generative adversarial network (GAN) loss using the target feature vectors in each target class and the adjusted domain discriminator; and further adjusting the initial target feature encoder to generate the target feature encoder according to a feature class matching loss using labeled target feature vectors and corresponding source feature class centers; and generating a target model by concatenating the adapted target feature encoder with the pre-trained source classifier of the pre-trained source model.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 4 depicts another exemplary targeted adversarial discriminative domain adaptation (T-ADDA) method according to various disclosed embodiments of the present disclosure;

FIGS. 5A-5B depict exemplary modified national institute of standards and technology database (MNIST) feature vectors obtained by minimizing a cross-entropy loss and minimizing a combined loss including a center loss and a cross-entropy loss according to various disclosed embodiments of the present disclosure;

FIG. 6 depicts exemplary pseudo code of a targeted adversarial discriminative domain adaptation (T-ADDA) method according to various disclosed embodiments of the present disclosure;

FIG. 7 depicts an exemplary structure of an implemented discriminator in a targeted adversarial discriminative domain adaptation (T-ADDA) method according to various disclosed embodiments of the present disclosure;

FIGS. 10A-10C depict t-distributed stochastic neighbor embedding (t-SNE) visualization of different feature vectors according to various disclosed embodiments of the present disclosure;

FIG. 11 depicts Devanagari handwritten character (DHC) numerals classification accuracy comparison according to various disclosed embodiments of the present disclosure;

DETAILED DESCRIPTION

References are made in detail to exemplary embodiments of the disclosure hereinafter, which are illustrated in the accompanying drawings. Wherever possible, same reference numbers may be used throughout the drawings to refer to same or similar parts.

Various unsupervised domain adaptation (DA) approaches have demonstrated desirable performance, but only when the domain shift is small. Subspace alignment (SA), one of early unsupervised DA approaches, may perform a transformation on the source and target domain representations in order to generate feature vectors that are domain invariant. Other approaches that perform subspace alignment may include correlation alignment (CORAL) and manifold aligned label transfer DA (MALT-DA), and/or the like. Adversarial learning may be often used by DA approaches. A domain adversarial neural networks (DANN) approach may use a gradient reversal layer to learn feature vectors that are class discriminative and domain invariant. Domain symmetric networks (SymNets) may be based on a symmetric design of source and target task classifiers and adversarial training with a domain confusion scheme for learning domain invariant representations.

Figure 1A:
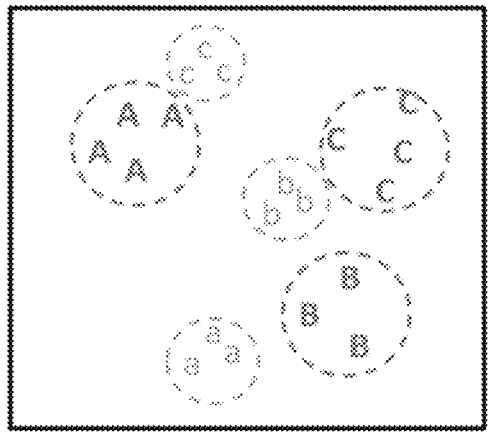
FIGS. 1A-1B depict unsupervised domain adaptation.
Figure 1B:
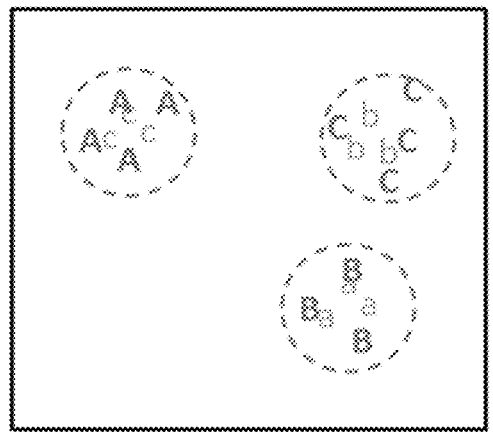
Figure 2A:
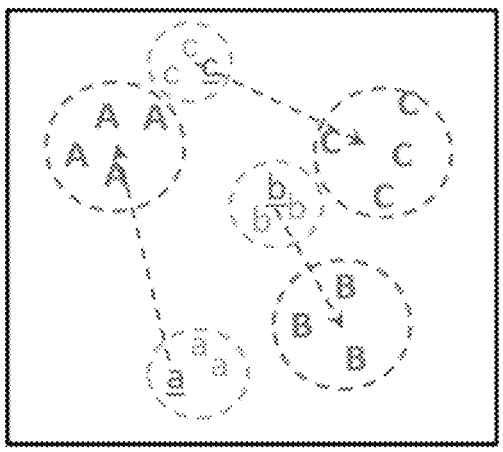
FIGS. 2A-2B depict exemplary targeted adversarial discriminative domain adaptation (T-ADDA) according to various disclosed embodiments of the present disclosure.
Figure 2B:
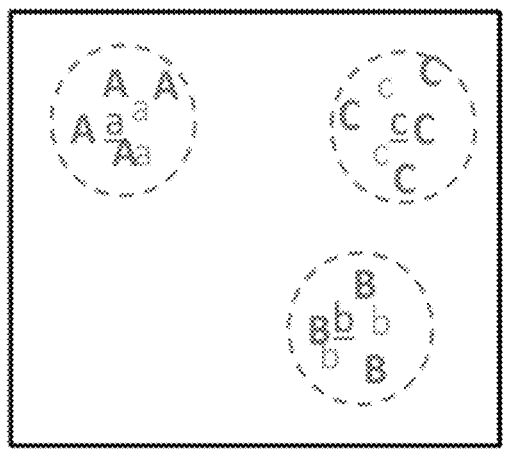

For applications such as transferring knowledge from one set of targets to another set of targets, unsupervised DA approaches may fail as the class correspondence is ambiguous without further information, and may not know how the adaptation should be proceeded, which is illustrated by the examples in FIGS. 1A-1B. FIGS. 1A-1B depict unsupervised domain adaptation. Referring to FIGS. 1A-1B, the capital letters represent classes in a source domain and the lower case letters represent classes in a target domain. For unsupervised DA, the target feature vectors (e.g., features) in classes a, b, and c may be adapted to nearby source classes A, B, and C. Without knowing the correspondence between the classes in source and target domains, adjacent classes in the source and target domains may be merged, which may be the best an unsupervised domain adaptation method can achieve. Obviously, the adaptation results may not necessarily correct; therefore, to obtain correct adaptation, an adaptation approach may need to know where the target classes a, b, and c should be adapted to. In targeted adversarial discriminative domain adaptation (T-ADDA), it is assumed that at least one labeled target image (e.g., labeled target feature vector) per target class may be available. FIGS. 2A-2B depict exemplary T-ADDA according to various disclosed embodiments of the present disclosure. Referring to FIGS. 2A-2B, the labeled target feature vectors are indicated by the underlined lower case letters. By enforcing all labeled target feature vectors to move toward their corresponding targeted source class centers as indicated by the dashed lines, T-ADDA may adapt a target model, such that the resulting target classes in the target domain may correctly match the corresponding source classes, as shown in FIG. 2B.

Adversarial discriminative domain adaptation (ADDA) is a generalized framework for adversarial domain adaptation that combines discriminative modeling, untied weight sharing, and a generative adversarial network (GAN) loss.

ADDA may first learn a discriminative representation using the labels in the source domain and then a separate encoding that maps the target data to a same space using an asymmetric mapping learned through a domain-adversarial loss. ADDA may be a simple, flexible, yet surprisingly powerful approach that achieves desirable visual adaptation results on standard DA datasets.

All of above-mentioned unsupervised DA approaches assume that the initial domain shift is relatively small that adjacent classes in the source and target domains correspond to a same target class. However, such assumption may not be true if the source and target domains are significantly different. When the source and target domains are significantly different, extra information in terms of one or more labeled target images may be needed, which is known as semi-supervised domain adaptation (SSDA).

SSDA may have not been fully explored with regard to deep learning based approaches. One notable SSDA work may be minimax entropy domain adaptation in the existing technology. In the minimax entropy domain adaptation, domain invariant class prototypes may be defined as weight vectors of a classifier C which takes normalized feature vectors as its input, and outputs the probability of classes with a softmax activation function. Then, the weight vectors may be updated during training to maximize the entropy measured by similarity between the weight vectors associated with the classifier C and unlabeled target feature vectors. Next, a feature extractor (e.g., encoder) F may be updated to minimize the entropy on unlabeled target example images to yield discriminative feature vectors extracted by F. Simultaneously, C and F may be trained to classify both labeled source example images and one or more labeled target example images correctly by minimizing the cross-entropy.

ADDA may use a GAN framework along with an adversarial loss for DA. Source images $X_s$ and labels $Y_s$ may be drawn from a source domain distribution $p_s(x,y)$; and target images $X_t$ may be drawn from a target domain distribution $p_t(x,y)$, where no labels are available. The objective may be to learn a target feature encoder $M_t$ and a target classifier $C_t$ that can correctly classify the target images into one of K categories at test time, despite of the lack of target domain annotations. Since direct supervised learning on the target images is not possible, domain adaptation may instead learn a source feature encoder $M_s$ along with a source classifier $C_s$, and then adapt that model (including $M_s$ and $C_s$) for use in the target domain, which may be accomplished by minimizing the distance between two empirical source and target distributions $M_s(X_s)$ and $M_t(X_t)$ and setting $C_t=C_s$.

The source classification model may be trained using the standard supervised cross-entropy loss given below:

$$\min_{M_S, C_S} \mathcal{L}_{cross-entropy}(X_S, Y_S) = \quad (1)$$

$$\mathbb{E}_{(x_s,y_s)\sim(X_S,Y_S)}\left[-\sum_{k=1}^{K}\mathbb{1}_{[k=y_s]} \log C_s(M_s(x_s))\right]$$

where $(x_s,y_s)\sim(X_s,Y_s)$ indicates that each sample $(x_s,y_s)$ follows the distribution of $(X_s,Y_s)$, which is $p_s(x,y)$; $(X_s,Y_s)$ represents a set of all source images and associated labels; K denotes a number of classes; k denotes a number of runs from 1 to K; and $\mathbb{1}_{[k=y_s]}$ is equal to 1 if $k=y_s$, otherwise, it is equal to 0.

To minimize the empirical source and target distributions $M_s(X_s)$ and $M_t(X_t)$, the adversarial learning of ADDA may include following two alternate adjustments (e.g., optimizations):

$$\min_{D} \mathcal{L}_{adv_D}(X_s, X_t, M_s, M_t) \quad (2)$$

$$\min_{M_t} \mathcal{L}_{adv_M}(X_t, D) \quad (3)$$

where D is a domain discriminator that classifies whether a data point is drawn from the source domain or the target domain. Equation (2) states that the domain discriminator D may be adjusted (e.g., optimized) according to an adversarial domain discrimination loss function $\mathcal{L}_{adv_D}$ defined as:

$$\mathcal{L}_{adv_D} = -\mathbb{E}_{x_s\sim X_s}[\log D(M_s(x_s))] - \mathbb{E}_{x_t\sim X_t}[\log(1-D(M_t(x_t)))] \quad (4)$$

In addition, equation (3) states that the target feature encoder $M_t$ may be adjusted (e.g., optimized) according a GAN loss function $\mathcal{L}_{GAN}$ defined as:

$$\mathcal{L}_{adv_M} = \mathcal{L}_{GAN} = -\mathbb{E}_{x_t\sim X_t}[\log(D(M_t(x_t)))] \quad (5)$$

It should be noted that the source feature encoder $M_s$ may be optimized during pre-training and fixed during the above-mentioned adversarial learning process. T-ADDA may be considered an extension of ADDA from unsupervised learning to semi-supervised learning.

Figure 3:
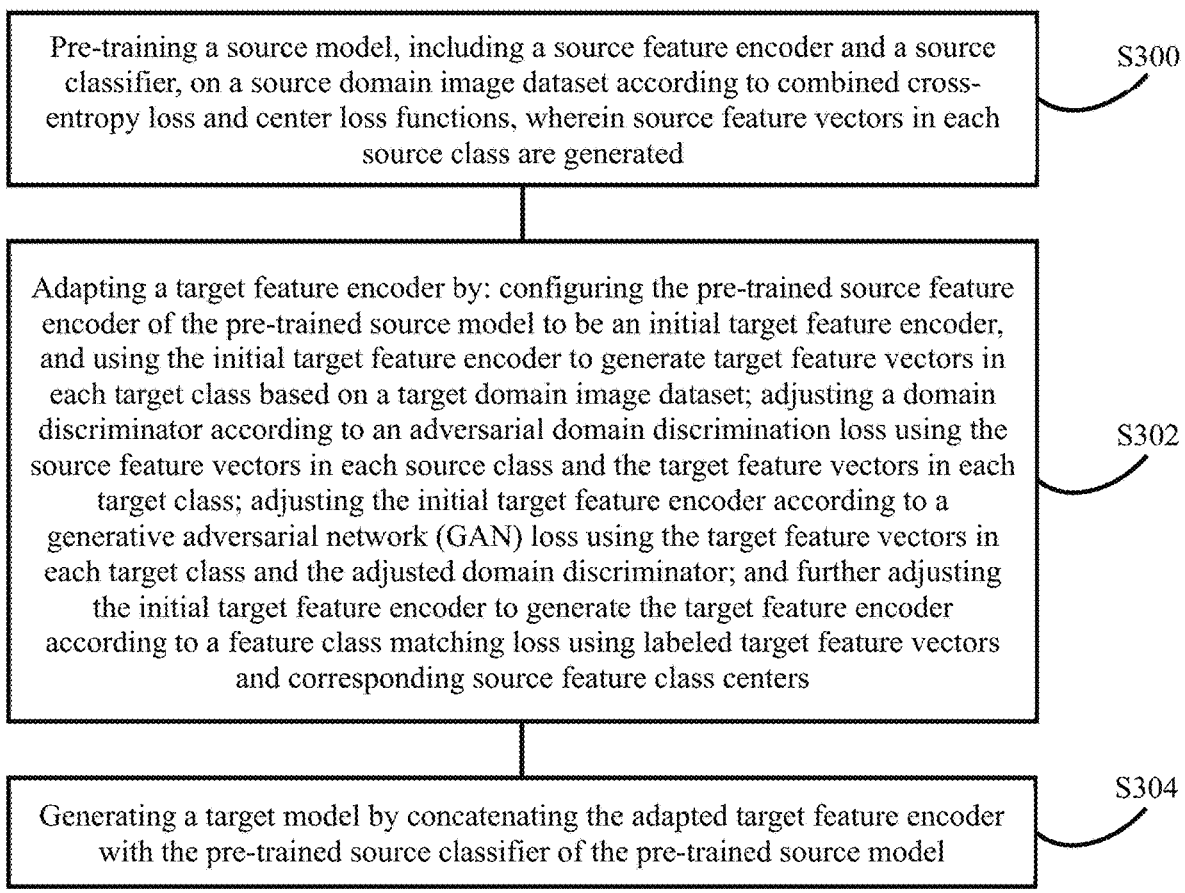
FIG. 3 depicts an exemplary targeted adversarial discriminative domain adaptation (T-ADDA) method according to various disclosed embodiments of the present disclosure.

Various embodiments of the present disclosure provide a method, a device, and a storage medium for targeted adversarial discriminative domain adaptation. FIG. 3 depicts an exemplary T-ADDA method according to various disclosed embodiments of the present disclosure. FIG. 4 depicts another exemplary T-ADDA method according to various disclosed embodiments of the present disclosure. According to various embodiments of the present disclosure, the T-ADDA method may include the following steps, as shown in FIGS. 3-4.

In S300, a source model, including a source feature encoder and a source classifier, may be pre-trained on a source domain image dataset according to combined cross-entropy loss and center loss functions, where source feature vectors in each source class are generated.

In S302, a target feature encoder may be adapted by configuring the pre-trained source feature encoder of the pre-trained source model to be an initial target feature encoder, and using the initial target feature encoder to generate target feature vectors in each target class based on a target domain image dataset; adjusting a domain discriminator according to an adversarial domain discrimination loss using the source feature vectors in each source class and the target feature vectors in each target class; adjusting the initial target feature encoder according to a generative adversarial network (GAN) loss using the target feature vectors in each target class and the adjusted domain discriminator; and further adjusting the initial target feature encoder to generate the target feature encoder according to a feature class matching loss using labeled target feature vectors and corresponding source feature class centers.

In S304, a target model may be generated by concatenating the adapted target feature encoder with the pre-trained source classifier of the pre-trained source model.

In one embodiment, pre-training the source model, including the source feature encoder and the source classifier, on the source domain image dataset according to the combined cross-entropy loss and center loss functions may include:

in a first stage, training the source model to generate a cross-entropy loss according to the cross-entropy loss function, and computing a center of the source feature vectors in each source class;

in a second stage, using the computed center of the source feature vectors in each source class, further training the source model to generate a center loss according to the center loss function; and minimizing a summation of the cross-entropy loss and the center loss to obtain the pre-trained source model including the pre-trained source feature encoder and the pre-trained source classifier.

In one embodiment, the target domain image dataset includes, for each target class, at least one labeled target image and a plurality of unlabeled target images.

In one embodiment, the source domain image dataset includes a plurality of labeled source images in each source class.

For T-ADDA given in FIGS. 2A-2B, the source and target feature vectors of different classes may be assumed to be well separated and clustered; and all target feature points of same classes may be assumed to follow the movements of one or more labeled target feature points to result in the desired adaptation result, which is enforced by adversarial learning. Combined cross-entropy and center loss functions may be used in the present disclosure to encourage separation and clustering of source feature vectors. However, it may not be straightforward to enforce clustering of target feature vectors, which may be encoded by an initial target feature extractor (e.g., target feature encoder).

When there are no labeled target images, T-ADDA provided in the present disclosure may be same as above-mentioned ADDA. When one or more labeled target images are available, three types of input data can be distinguished in T-ADDA: labeled source data $X_s$, target data $X_t$, and labeled target data $X'_t \subset X_t$. The use of $X_s$ and $X_t$ in T-ADDA may be same as the use of $X_s$ and $X_t$ in ADDA, which is described in equations (4) and (5). When one or more labeled target images are available (i.e., $X'_t$ is not an empty set), the above-mentioned target feature encoder $M_t$ may be further optimized according to the following feature class matching loss function:

$$\mathcal{L}_{FCM} = \sum_{i=1}^{n} \|C_{\hat{y}_i} - x'_i\|_2^2 \qquad (6)$$

wherein $\hat{y}_i$ denotes a label corresponding to an i-th target feature vector; $C_{\hat{y}_i}$ denotes a $\hat{y}_i$-th source feature class center; $x'_i$ denotes an i-th labeled target feature vector; and n is a number of labeled target images.

FIG. 4 depicts another exemplary T-ADDA method according to various disclosed embodiments of the present disclosure. In exemplary Step 1, the source model may be pre-trained using the training dataset of the source domain with either cross-entropy or combined cross-entropy and center loss functions. Once the source model is pre-trained, the center of feature vectors in each class may be computed and saved. In exemplary Step 2, the target feature encoder $M_t$ may be adapted, such that the feature vectors extracted by the target feature encoder $M_t$ may not be distinguished from the feature vectors extracted by the source feature encoder $M_s$. $\mathcal{L}_{adv_D}$, $\mathcal{L}_{adv_M}$, and $\mathcal{L}_{FCM}$ given in equations (4), (5) and (6) may be adjusted (e.g., optimized) alternately. In exemplary Step 3, the target model may be formed by concatenating the adapted target feature encoder with the classifier (e.g., classification layer) of the source model, which may be configured to classify images in the target domain.

Though supervised training via minimizing categorical cross-entropy loss is guaranteed to generate discriminative feature vectors, well-clustered feature vectors may not be guaranteed. It should be noted that by combining cross-entropy loss and center loss functions, well clustered feature vectors may be generated, and classifier accuracy may be improved. The center loss may be configured in various embodiments of the present disclosure for improving both source model performance and T-ADDA performance.

The center loss function is formulated by:

$$\mathcal{L}_C = \frac{1}{2}\sum_{i=1}^{m}\|x_i - C_{y_i}\|_2^2 \qquad (7)$$

where $x_i$ and $y_i$ denote an i-th source feature vector and a label corresponding to the i-th source feature vector, respectively; $C_{y_i}$ denotes a $y_i$-th source feature class center; and m is a number of Labeled source images.

Above-mentioned formulation may encourage each encoded feature point to move toward the corresponding class center $C_{y_i}$. According to various embodiments of the present disclosure, a two-stage training process may be adopted to simplify the implementation. In the first stage, the source model may be trained using cross-entropy loss function only, and the centers of feature vectors of all classes which encourage feature clustering may be computed. In the second stage, the computed class centers may then be used in equation (7) to compute the center loss. The complete loss to be minimized may be the combination of the cross-entropy loss and the center loss expressed by:

$$\mathcal{L} = \lambda \cdot \mathcal{L}_C + \mathcal{L}_S \qquad (8)$$

where $\mathcal{L}_S$ denotes the standard cross-entropy loss, $\mathcal{L}_C$ denotes the center loss shown in equation (7), and $\lambda$ denotes a weight to balance contribution of above-mentioned two losses.

A visual comparison of feature vectors resulting from the cross-entropy loss and the combined loss including the cross-entropy loss and the center loss may be illustrated in FIGS. 5A-5B. FIGS. 5A-5B depict exemplary modified national institute of standards and technology database (MNIST) feature vectors obtained by minimizing the cross-entropy loss and minimizing the combined loss including the center loss and the cross-entropy loss according to various disclosed embodiments of the present disclosure. According to various embodiments of the present disclosure, MNIST data and LeNet++ source model may be configured to generate the plots shown in FIGS. 5A-5B by setting the feature dimension to be two. It should be noted that in T-ADDA, the computed source class centers may be used in the feature matching loss function given in equation (6) where the source class centers are denoted by $C_{y_i}$.

In one embodiment, the source model may be based on LeNet++. Table 1 shows the summary of the LeNet++ based model, which is a variation of LeNet++ by incorporating batch normalization and dropout layers. The source feature encoder may be formed from an InputLayer to a layer ip1. The dimension of the feature space may be fixed at 500; and a dense layer ip2 may serve as a linear 10 class classifier. The LeNet++ based source model, after being trained with source domain dataset, may be used as an initial target model for adaptation.

TABLE 1

| Layer (type) | Output shape | Parameter # |
|---|---|---|
| input (InputLayer) | (None, 32, 32, 3) | 0 |
| conv2d_01 (Conv2D) | (None, 32, 32, 32) | 2432 |
| bn_01 (BatchNorm) | (None, 32, 32, 32) | 128 |
| conv2d_02 (Conv2D) | (None, 32, 32, 32) | 25632 |
| bn_02 (BatchNorm) | (None, 32, 32, 32) | 128 |
| max_pooling2d_02 (MaxPooling2D) | (None, 16, 16, 32) | 0 |
| conv2d_03_1 (Conv2D) | (None, 16, 16, 64) | 51264 |
| bn_03_1 (BatchNorm) | (None, 16, 16, 64) | 128 |
| max_pooling2d_02 (MaxPooling2D) | (None, 16, 16, 32) | 0 |
| conv2d_03_2 (Conv2D) | (None, 16, 16, 64) | 102464 |
| bn_03_2 (BatchNorm) | (None, 16, 16, 64) | 256 |
| max_pooling2d_03 (MaxPooling2D) | (None, 8, 8, 64) | 0 |
| conv2d_04_1 (Conv2D) | (None, 8, 8, 128) | 204928 |
| bn_04_1 (BatchNorm) | (None, 8, 8, 128) | 512 |
| conv2d_04_2 (Conv2D) | (None, 8, 8, 128) | 409728 |
| max_pooling2d_04 (MaxPooling2D) | (None, 4, 4, 128) | 0 |
| activation_04 (Activation) | (None, 4, 4, 128) | 0 |
| bn_04_2 (BatchNorm) | (None, 4, 4, 128) | 512 |
| flatten (Flatten) | (None, 2048) | 0 |
| Dropout (Dropout) | (None, 2048) | 0 |
| ip1 (Dense) | (None, 500) | 1024500 |
| ip2 (Dense) | (None, 10) | 5010 |
| Total parameters: | | 1,827,750 |

FIG. 6 depicts exemplary pseudo code of the T-ADDA method according to various disclosed embodiments of the present disclosure. Referring to FIG. 6, the pseudo code summarizes the T-ADDA method according to various embodiments of the present disclosure. A network gan may be formed by concatenating targetEncoder with discriminator, and only the targetEncoder may be trainable. Finally, a network fcm may be implemented in a manner similar to how the source model is trained by combined center loss and cross-entropy loss functions. However, in the network fcm, only the center loss may be used. The label dummy_y may be randomly generated as no label is required for employing the center loss function.

FIG. 7 depicts an exemplary structure of an implemented discriminator in the T-ADDA method according to various disclosed embodiments of the present disclosure. Referring to FIG. 7, in one embodiment, a network discriminator may include three dense layers.

According to various embodiments of the present disclosure, the T-ADDA method may be evaluated against three datasets with 10 digit classes which include the MNIST database, the street view house numbers (SVHN) database, and the Devanagari handwritten character (DHC) database. In one embodiment, the MNIST database may include 70,000 grayscale handwritten digit images; and among them, 60,000 images may form a training set, and the remaining 10,000 may form a test set. The MNIST database may be commonly used for developing and testing various image processing systems.

SVHN is a real-world image dataset for developing machine learning and object recognition approaches with minimal requirements on data preprocessing and formatting. It can be seen that, similar to the MNIST database (e.g., the images with small cropped digits), the SVHN database may incorporate an order of magnitude more labeled data (e.g., over 600,000 digit images) and come from a significantly harder, unsolved, real-world problem (e.g., recognizing digits and numbers in natural scene images). Among them, 73257 images may be configured for training and 26032 images may be configured for testing. The SVHN database may be obtained from house numbers in Google street view images; and the image size in the SVHN database may be 32×32.

The DHC database is a database of handwritten Devanagari characters including 46 classes of characters. 46 classes of characters may be 36 classes of alphabet characters and 10 classes of numeral characters. The image size in the DHC database may be 32×32.

Figure 8A:
FIGS. 8A-8C depict exemplary Arabic numerals in modified national institute of standards and technology database (MNIST) and street view house numbers (SVHN) databases, and Devanagari numerals in a Devanagari handwritten character (DHC) database according to various disclosed embodiments of the present disclosure.
Figure 8B:
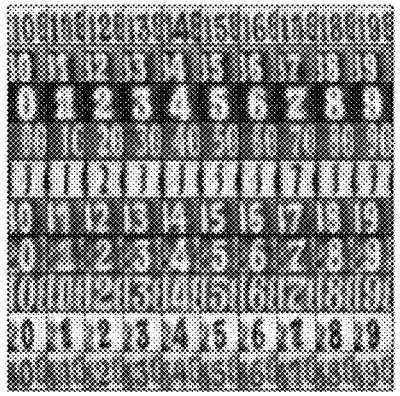
Figure 8C:
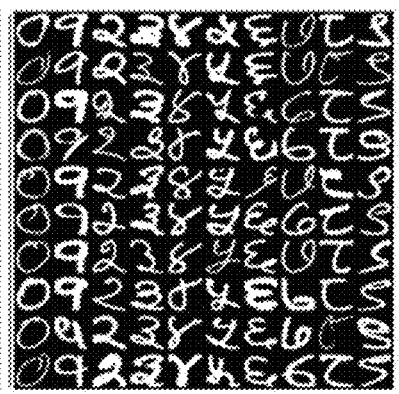

Exemplary digit images from the MNIST, SVHN, and DHC databases may be provided for comparison in FIGS. 8A-8C. FIGS. 8A-8C depict exemplary Arabic numerals in the MNIST and SVHN databases, and Devanagari numerals in the DHC database according to various disclosed embodiments of the present disclosure. It should be noted that that same digits in Arabic and Devanagari numerals may not necessarily have same meaning. For example, Arabic digit 9 may resemble Devanagari digit 1.

Scenario 1: Transfer Learning From Simulated Data to Measured Data

In scenario 1, the SVHN dataset may be configured as the simulated data, as being collected from printed house numbers; and the MNIST dataset may be configured as the measured data, as being hand-written digits. In the first exemplary stage of scenario 1, the source model may be trained using cross-entropy (to be minimized) as the loss function. Then, the centers of source classes $S_i$, i=1 . . . K, in the feature space may be computed and saved, where K is the number of source classes. Next, the source model may be trained by minimizing the combined loss including the cross-entropy loss and the center loss. At this point, the first stage (e.g., source model training) may be completed according to various embodiments of the present disclosure. In the second exemplary stage (e.g., adversarial domain adaptation) of scenario 1, the source model may be configured as the initial target model followed by randomly selecting N target images for labelling, where 10≥N≥0, and T-ADDA may be performed. When N is equal to 0, T-ADDA may reduce to ADDA; and such process may be repeated for 10 times. For each value of N, the process may be repeated for multiple times (e.g., 10 times). For example, in the first run, N=1 target image may be randomly selected for labeling and T-ADDA may be performed; and for the second time, another target image may be randomly selected for labeling and T-ADDA may be performed. Finally, in the last exemplary stage of scenario 1, the classifier (e.g., classification layer) of the source model and the adapted target feature encoder may be combined to evaluate the performance of the target model before and after adaptation. Table 2 lists the common settings for the T-ADDA method.

TABLE 2

| | Digit Images | |
|---|---|---|
| Base model | LeNet++ based | |
| Input size | 32 × 32 × 3 | |
| Feature space dimension | 256 | |
| Epochs for source training | 11 | |
| Optimizer | Stochastic gradient descent (SGD) | |
| | Cross-entropy | Center loss |
| Source training learning rate | 0.001 | 0.001 |
| λ | N/A | 0.05 |
| discriminator learning rate | 0.002 | |
| gan network learning rate | 0.0002 | |
| fcm network learning rate | 0.002 | |
| Epochs for adaptation | 61 | |

Figure 9:
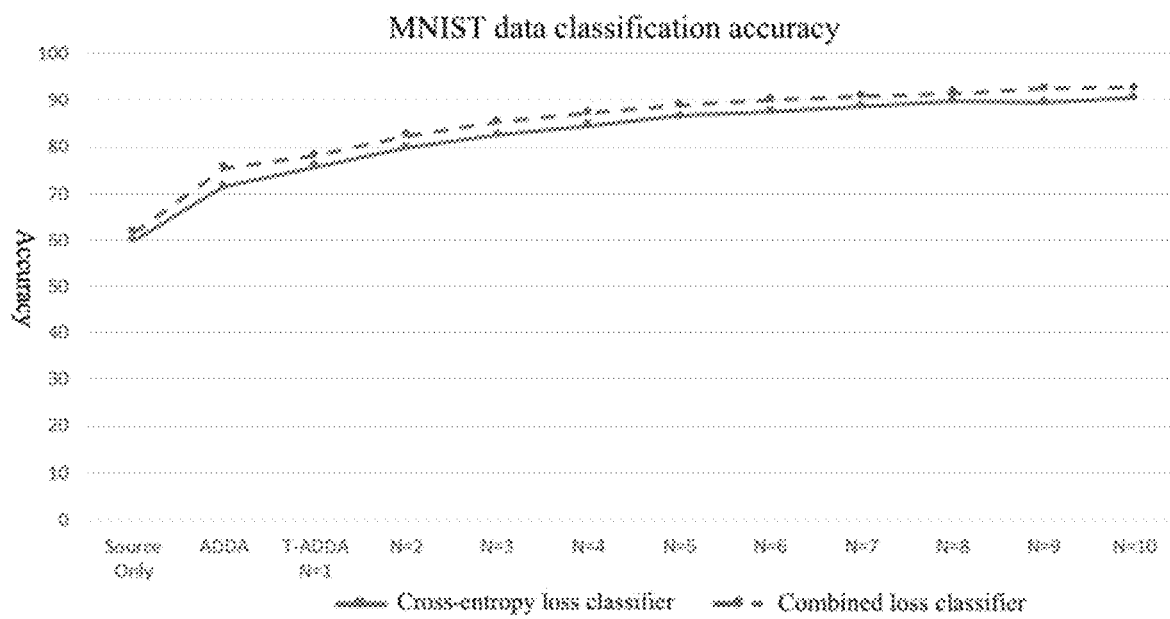
FIG. 9 depicts modified national institute of standards and technology database (MNIST) data classification accuracy comparison according to various disclosed embodiments of the present disclosure.

According to various embodiments of the present disclosure, the results from scenario 1 may be described hereinafter. The accuracy of the cross-entropy trained source classifier on source validation data may be about 92.86%, and the accuracy of the combined cross-entropy and center loss trained source classifier on source validation data may be about 93.65%. In one embodiment, these two values may be configured as the upper bounds of target classifier performance after adaptation. Table 3 lists classification accuracy of the T-ADDA method for SVHN to MNIST adaptation with N=0, 2, 4, 8 and 10. FIG. 9 depicts MNIST data classification accuracy comparison according to various disclosed embodiments of the present disclosure. It can be seen that the T-ADDA method may be significantly effective with improved performance of about 3% to about 18% over the ADDA method when N is increased from 1 to 10. For example, as shown in FIG. 9, the accuracy for the ADDA method may be about 71.5% and 75.5% for the cross-entropy loss classifier and the center loss classifier, respectively; and the accuracy for N=10 may be about 90.8% and 93.0% for the cross-entropy loss classifier and the center loss classifier, respectively. Therefore, the mean accuracy difference between the ADDA method and the T-ADDA (N=10) may be about 18.4%. In addition, it should be noted that the standard deviation may decrease with increased N, which may indicate that target images selected for labelling may have an impact on the adaptation results. Furthermore, the results may show that the combined cross-entropy and center loss approach may consistently outperform the cross-entropy loss approach by about 2%-4%, which indicates that a better clustered source domain may be beneficial for performing domain adaptation via the T-ADDA method.

with the combined loss including the cross-entropy loss and the center loss) shown in FIGS. 10A-10C, when 10 (N=10) target images (about 1% of the total target images) are randomly selected for labeling, the performance of the T-ADDA method may approach the upper bounds established by evaluating the source classifier on source validation data.

Scenario 2: Transfer Learning From One Target Set to Another Target Set

In scenario 2, it may utilize one or more labeled target samples to adapt the classifier which is trained to classify a set of characters in SVHN dataset to become another classifier which classifies a different set of characters in DHC dataset. As shown in FIGS. 8B-8C, though images of numerals from zero to nine are employed in both datasets, it can be seen that only 0, 2, and 3 may be visually similar and represent same numerals; and other numerals may be either new to one another (e.g., 1, 4, 5, 7, and 8 in the SVHN dataset), or represent different numerals (e.g., 6 and 9 in the SVHN dataset).

According to various embodiments of the present disclosure, the results from scenario 2 may be described hereinafter. The accuracy of the cross-entropy trained source classifier on source validation data may be about 92.86%, and the accuracy of the combined cross-entropy and center loss trained source classifier on source validation data may be about 93.65%. In one embodiment, these two values can be used as the upper bounds of target classifier performance after adaptation. Table 4 lists classification accuracy of the T-ADDA method for SVHN to DHC adaptation with N=0,

TABLE 3

| Source model | Source only | N = 0 T-ADDA (i.e., ADDA) | N = 2 T-ADDA | N = 4 T-ADDA | N = 6 T-ADDA | N = 8 T-ADDA | N = 10 T-ADDA |
|---|---|---|---|---|---|---|---|
| Trained with the cross-entropy loss | .599 | .715 ± .050 | .799 ± .026 | .846 ± .012 | .877 ± .010 | .897 ± .009 | .907 ± .005 |
| Trained with the combined loss | .616 | .755 ± .027 | .824 ± .020 | .874 ± .008 | .901 ± .008 | .915 ± .007 | .929 ± .005 |

FIGS. 10A-10C depict t-distributed stochastic neighbor embedding (t-SNE) visualization of different feature vectors according to various disclosed embodiments of the present disclosure. Referring to FIGS. 10A-10C, two t-SNE visualizations of the source domain containing the feature vectors of ten digits classes, and one t-SNE visualization of feature vectors in the target domain may be provided in various embodiments of the present disclosure. Referring to FIG. 10A, source feature vectors may be extracted from the cross-entropy trained source model; referring to FIG. 10B, source feature vectors may be extracted from the combined cross-entropy and center loss trained source model; and referring to FIG. 10C, target feature vectors may be extracted from the combined cross-entropy and center loss trained source model. It should be noted that the target feature vectors extracted from the cross-entropy trained source model (not shown in FIGS. 10A-10C) may be extremely similar to the target feature vectors extracted from the combined cross-entropy and center loss trained source model. It can be seen that the target feature vectors may be well separated and clustered shown in FIG. 10C. Additionally, in both cases (trained with cross-entropy loss only and 2, 4, 8 and 10. FIG. 11 depicts DHC numerals classification accuracy comparison according to various disclosed embodiments of the present disclosure. Referring to Table 4 and FIG. 11, it can be seen that that the ADDA method may fail in such case where the target domain is DHC, which is expected as under the scenario where the target sets in the source and target domains are different; and the domain shift may be expected to be large, so that the adapted target domain may not necessarily match the source domain in terms of class labels. Furthermore, the T-ADDA method may be extremely effective with improved performance from about 18% to 80% over the ADDA method when N is increased from 1 to 10. However, the improvement of combined cross-entropy and center loss trained source classifier over the cross-entropy trained source classifier may be reduced. It should be noted that, when 10 target images per class (e.g., <0.6%) are randomly selected for labeling, the adaptation result from cross-entropy trained source classifier may reach the performance upper bound, and the adaptation result from combined cross-entropy and center loss trained source classifier may exceed the performance upper bound established by applying source classifier on source validation data, which may be indicated by the bold values in Table 4.

TABLE 4

| Source model | Source only | N = 0 T-ADDA (i.e., ADDA) | N = 2 T-ADDA | N = 4 T-ADDA | N = 6 T-ADDA | N = 8 T-ADDA | N = 10 T-ADDA |
|---|---|---|---|---|---|---|---|
| Trained with the cross-entropy loss | .142 | .153 ± .049 | .651 ± .094 | .855 ± .016 | .898 ± .013 | .915 ± .014 | .929 ± .008 |
| Trained with the combined loss | .142 | .134 ± .029 | .667 ± .108 | .863 ± .022 | .906 ± .013 | .921 ± .010 | .939 ± .010 |

Figure 12A:
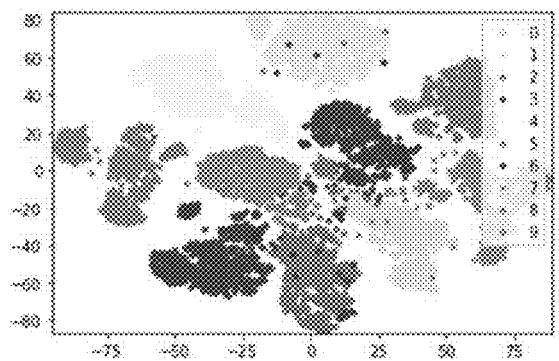
FIGS. 12A-12B depict t-distributed stochastic neighbor embedding (t-SNE) visualization of different target feature vectors encoded by a same source feature encoder according to various disclosed embodiments of the present disclosure.
Figure 12B:
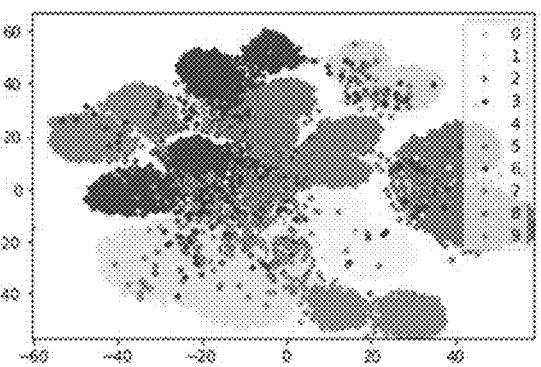

According to various embodiments of the present disclosure, desirable performance of the SVHN to DHC adaptation that exceeds both the performance of the SVHN to MNIST adaptation and the performance upper bounds may be attributed to the lack of diversity of the DHC data within same classes as compared to that in the MNIST and SVHN datasets. In other words, the DHC feature vectors encoded by the SVHN trained source feature encoder may be extremely well separated and clustered, which may be confirmed by the t-SNE visualization shown in FIG. 12A. FIGS. 12A-12B depict t-SNE visualization of different target feature vectors encoded by a same source feature encoder according to various disclosed embodiments of the present disclosure. For comparison, the t-SNE visualization of the feature vectors of the SVHN validation dataset encoded by the SVHN trained source feature encoder may be displayed in FIG. 12B. As shown in FIGS. 12A-12B, obviously, the DHC feature vectors may be better separated than the SVHN (validation set) feature vectors, which may explain why the target classifier outperforms the source classifier when they are evaluated against target and source domain datasets respectively.

Figure 13A:
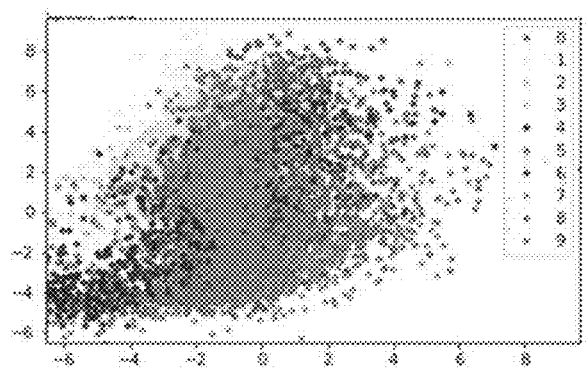
FIGS. 13A-13D depict t-distributed stochastic neighbor embedding (t-SNE) visualization of Devanagari handwritten character (DHC) feature vectors according to various disclosed embodiments of the present disclosure.
Figure 13B:
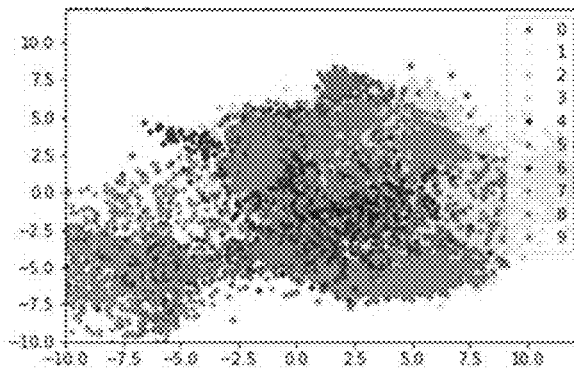
Figure 13C:
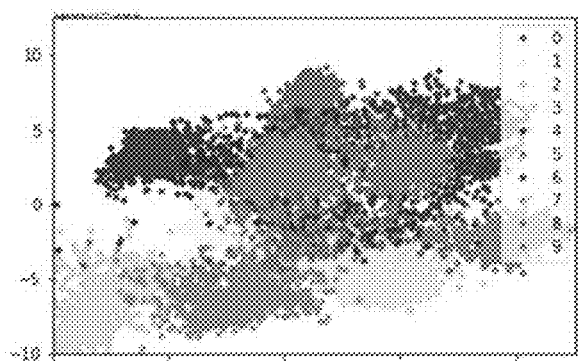
Figure 13D:
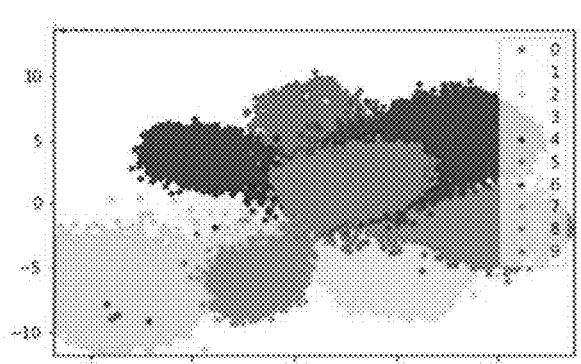
Figure 14A:
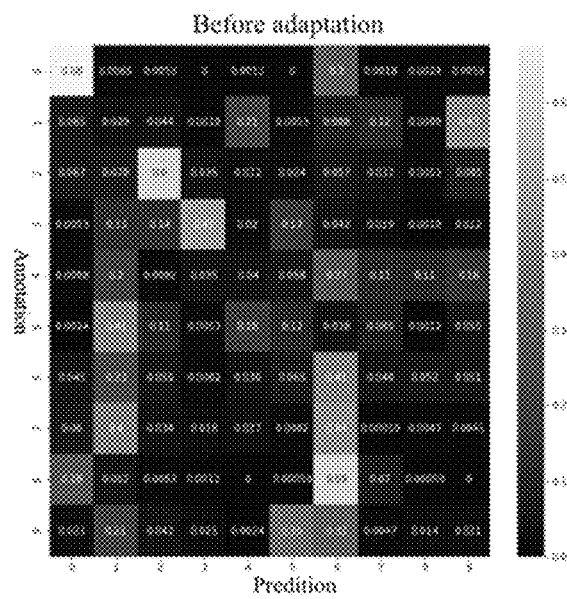
FIGS. 14A-14B depict confusion matrixes resulting from a target model before and after targeted adversarial discriminative domain adaptation (T-ADDA) according to various disclosed embodiments of the present disclosure.
Figure 14B:
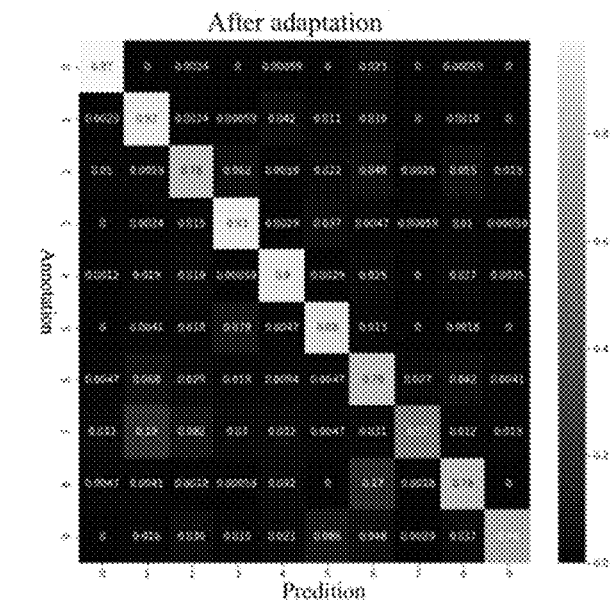

FIGS. 13A-13D depict t-SNE visualization of DHC feature vectors according to various disclosed embodiments of the present disclosure. Referring to FIGS. 13A-13D, to visualize the adaptation results, the parametric t-SNE visualizations of the DHC feature vectors before adaptation (FIG. 13A), after ADDA adaptation (FIG. 13B), and after T-ADDA (FIG. 13C) may be provided according to various embodiments of the present disclosure. The parametric t-SNE model may be trained by the feature vectors of the source training set extracted by the source feature encoder, as shown in FIG. 13D, to which the DHC feature vectors may be adapted. Finally, it can be seen that the classification performance for each target class may be obtained by observing the confusion matrixes resulting from the target model before and after T-ADDA. FIGS. 14A-14B depict confusion matrixes resulting from the target model before and after T-ADDA (N=10) according to various disclosed embodiments of the present disclosure.

From the confusion matrixes resulting from the initial target model shown in FIG. 14A, relatively desirable performance may be observed for digits 0, 2, and 3, with classification accuracies of 0.68, 0.6, and 0.47 respectively, which may be consistent with the observation that these three digits share extremely similar forms. After adaptation, distributions of all ten target classes may be extremely close to the distributions of the corresponding ten source classes as observed from FIG. 14B with the lowest classification accuracy associated with numeral seven in the source domain. About 60% (57% precisely) of numeral seven in the DHC dataset may be correctly classified as numeral seven in the SVHN dataset; and about 20% (19% precisely) of numeral seven in the DHC dataset may be misclassified as numeral one in the SVHN dataset.

According to various embodiments of the present disclosure, the robust domain adaptation method (T-ADDA), which is a semi-supervised method to provide required robustness for scenarios where the initial domain shift is large, may be provided. By providing at least one labeled target image per class, it can be seen that T-ADDA may significantly boost the performance of ADDA and may be applicable to the challenging scenario where the target sets in the source and target domains are not same. Digit image datasets including the MNIST, SVHN, and DHC datasets may be used to evaluate the T-ADDA method (e.g., framework). Two scenarios have been tested including transferring knowledge from simulated data to measure data (SVHN to MNIST), and transferring knowledge from one target set to another target set (SVHN to DHC). It can be seen that the T-ADDA method may be extremely effective, even when the available labeled target images are as few as two images per class in the scenario 2.

Various embodiments of the present disclosure further provide a targeted adversarial discriminative domain adaptation (T-ADDA) device. The device includes a memory, configured to store program instructions for performing a T-ADDA method; and a processor, coupled with the memory and, when executing the program instructions, configured for: pre-training a source model, including a source feature encoder and a source classifier, on a source domain image dataset according to combined cross-entropy loss and center loss functions, where source feature vectors in each source class are generated; adapting a target feature encoder by: configuring the pre-trained source feature encoder of the pre-trained source model to be an initial target feature encoder, and using the initial target feature encoder to generate target feature vectors in each target class based on a target domain image dataset; adjusting a domain discriminator according to an adversarial domain discrimination loss using the source feature vectors in each source class and the target feature vectors in each target class; adjusting the initial target feature encoder according to a generative adversarial network (GAN) loss using the target feature vectors in each target class and the adjusted domain discriminator; and further adjusting the initial target feature encoder to generate the target feature encoder according to a feature class matching loss using labeled target feature vectors and corresponding source feature class centers; and generating a target model by concatenating the adapted target feature encoder with the pre-trained source classifier of the pre-trained source model.

Various embodiments of the present disclosure further provide a non-transitory computer-readable storage medium, containing program instructions for, when being executed by a processor, performing a targeted adversarial discriminative domain adaptation (T-ADDA) method, the method including: pre-training a source model, including a source feature encoder and a source classifier, on a source domain image dataset according to combined cross-entropy loss and center loss functions, where source feature vectors in each source class are generated; adapting a target feature encoder by: configuring the pre-trained source feature encoder of the pre-trained source model to be an initial target feature encoder, and using the initial target feature encoder to generate target feature vectors in each target class based on a target domain image dataset; adjusting a domain discriminator according to an adversarial domain discrimination loss using the source feature vectors in each source class and the target feature vectors in each target class; adjusting the initial target feature encoder according to a generative adversarial network (GAN) loss using the target feature vectors in each target class and the adjusted domain discriminator; and further adjusting the initial target feature encoder to generate the target feature encoder according to a feature class matching loss using labeled target feature vectors and corresponding source feature class centers; and generating a target model by concatenating the adapted target feature encoder with the pre-trained source classifier of the pre-trained source model.

The embodiments disclosed herein may be exemplary only. Other applications, advantages, alternations, modifications, or equivalents to the disclosed embodiments may be obvious to those skilled in the art and be intended to be encompassed within the scope of the present disclosure.

What is claimed is:

1. A targeted adversarial discriminative domain adaptation (T-ADDA) method, comprising:
pre-training a source model, including a source feature encoder and a source classifier, on a source domain image dataset according to combined cross-entropy loss and center loss functions, wherein source feature vectors in each source class are generated, the center loss function is expressed by $$\mathcal{L}_C = \frac{1}{2}\sum_{i=1}^{m}\|x_i - C_{y_i}\|_2^2,$$

$x_i$ and $y_i$ denote an i-th source feature vector and a label corresponding to the i-th source feature vector, respectively, $C_{y_i}$ denotes a $y_i$-th source feature class center, and m is a number of labeled source images;
adapting a target feature encoder by:
configuring the pre-trained source feature encoder of the pre-trained source model to be an initial target feature encoder, and using the initial target feature encoder to generate target feature vectors in each target class based on a target domain image dataset;
adjusting a domain discriminator according to an adversarial domain discrimination loss using the source feature vectors in each source class and the target feature vectors in each target class;
adjusting the initial target feature encoder according to a generative adversarial network (GAN) loss using the target feature vectors in each target class and the adjusted domain discriminator; and
further adjusting the initial target feature encoder to generate the target feature encoder according to a feature class matching loss using labeled target feature vectors and corresponding source feature class centers; and
generating a target model by concatenating the adapted target feature encoder with the pre-trained source classifier of the pre-trained source model.

2. The method according to claim 1, wherein pre-training the source model, including the source feature encoder and the source classifier, on the source domain image dataset according to the combined cross-entropy loss and center loss functions includes:
in a first stage, training the source model to generate a cross-entropy loss according to the cross-entropy loss function, and computing a center of the source feature vectors in each source class;
in a second stage, using the computed center of the source feature vectors in each source class, further training the source model to generate a center loss according to the center loss function; and
minimizing a summation of the cross-entropy loss and the center loss to obtain the pre-trained source model including the pre-trained source feature encoder and the pre-trained source classifier.

3. The method according to claim 1, wherein:
the target domain image dataset includes, for each target class, at least one labeled target image and a plurality of unlabeled target images.

4. The method according to claim 1, wherein:
the source domain image dataset includes a plurality of labeled source images in each source class.

5. The method according to claim 1, wherein the feature class matching loss function is expressed by:

$$\mathcal{L}_{FCM} = \sum_{i=1}^{n}\|C_{\hat{y}_i} - x'_i\|_2^2$$

wherein $\hat{y}_i$ denotes a label corresponding to an i-th target feature vector; $C_{\hat{y}_i}$ denotes a $\hat{y}_i$-th source feature class center; $x'_i$ denotes an i-th labeled target feature vector; and n is a number of labeled target images.

6. A targeted adversarial discriminative domain adaptation (T-ADDA) device, comprising:
a memory, configured to store program instructions for performing a T-ADDA method; and
a processor, coupled with the memory and, when executing the program instructions, configured for:
pre-training a source model, including a source feature encoder and a source classifier, on a source domain image dataset according to combined cross-entropy loss and center loss functions, wherein source feature vectors in each source class are generated, the center loss function is expressed by $$\mathcal{L}_C = \frac{1}{2}\sum_{i=1}^{m}\|x_i - C_{y_i}\|_2^2,$$

$x_i$ and $y_i$ denote an i-th source feature vector and a label corresponding to the i-th source feature vector, respectively, $C_{y_i}$ denotes a $y_i$-th source feature class center, and m is a number of labeled source images;
adapting a target feature encoder by:
configuring the pre-trained source feature encoder of the pre-trained source model to be an initial target feature encoder, and using the initial target feature encoder to generate target feature vectors in each target class based on a target domain image dataset;

adjusting the domain discriminator according to an adversarial domain discrimination loss using the source feature vectors in each source class and the target feature vectors in each target class;

adjusting the initial target feature encoder according to a generative adversarial network (GAN) loss using the target feature vectors in each target class and the adjusted domain discriminator; and further adjusting the initial target feature encoder to generate the target feature encoder according to a feature class matching loss using labeled target feature vectors and corresponding source feature class centers; and generating a target model by concatenating the adapted target feature encoder with the pre-trained source classifier of the pre-trained source model.

7. The device according to claim 6, wherein pre-training the source model, including the source feature encoder and the source classifier, on the source domain image dataset according to the combined cross-entropy loss and center loss functions includes:

in a first stage, training the source model to generate a cross-entropy loss according to the cross-entropy loss function, and computing a center of the source feature vectors in each source class;

in a second stage, using the computed center of the source feature vectors in each source class, further training the source model to generate a center loss according to the center loss function; and minimizing a summation of the cross-entropy loss and the center loss to obtain the pre-trained source model including the pre-trained source feature encoder and the pre-trained source classifier.

8. The device according to claim 6, wherein:
the target domain image dataset includes, for each target class, at least one labeled target image and a plurality of unlabeled target images.

9. The device according to claim 6, wherein:
the source domain image dataset includes a plurality of labeled source images in each source class.

10. The device according to claim 6, wherein the feature class matching loss function is expressed by:

$$\mathcal{L}_{FCM} = \sum_{i=1}^{n} \|C_{\hat{y}_i} - x'_i\|_2^2$$

wherein $\hat{y}_i$ denotes a label corresponding to an i-th target feature vector; $C\hat{y}_i$ denotes a $\hat{y}_i$-th source feature class center; $x'_i$ denotes an i-th labeled target feature vector; and n is a number of labeled target images.

11. A non-transitory computer-readable storage medium, containing program instructions for, when being executed by a processor, performing a targeted adversarial discriminative domain adaptation (T-ADDA) method, the method comprising:

pre-training a source model, including a source feature encoder and a source classifier, on a source domain image dataset according to combined cross-entropy loss and center loss functions, wherein source feature vectors in each source class are generated, the center loss function is expressed $$\mathcal{L}_C = \frac{1}{2} \sum_{i=1}^{m} \|x_i - C_{y_i}\|_2^2,$$

by $x_i$ and $y_i$ denote an i-th source feature vector and a label corresponding to the i-th source feature vector, respectively, $C_{y_i}$ denotes a y-th source feature class center, and m is a number of labeled source images;

adapting a target feature encoder by:
configuring the pre-trained source feature encoder of the pre-trained source model to be an initial target feature encoder, and using the initial target feature encoder to generate target feature vectors in each target class based on a target domain image dataset;

adjusting the domain discriminator according to an adversarial domain discrimination loss using the source feature vectors in each source class and the target feature vectors in each target class;

adjusting the initial target feature encoder according to a generative adversarial network (GAN) loss using the target feature vectors in each target class and the adjusted domain discriminator; and further adjusting the initial target feature encoder to generate the target feature encoder according to a feature class matching loss using labeled target feature vectors and corresponding source feature class centers; and generating a target model by concatenating the adapted target feature encoder with the pre-trained source classifier of the pre-trained source model.

12. The storage medium according to claim 11, wherein pre-training the source model, including the source feature encoder and the source classifier, on the source domain image dataset according to the combined cross-entropy loss and center loss functions includes:

in a first stage, training the source model to generate a cross-entropy loss according to the cross-entropy loss function, and computing a center of the source feature vectors in each source class;

in a second stage, using the computed center of the source feature vectors in each source class, further training the source model to generate a center loss according to the center loss function; and minimizing a summation of the cross-entropy loss and the center loss to obtain the pre-trained source model including the pre-trained source feature encoder and the pre-trained source classifier.

13. The storage medium according to claim 11, wherein:
the target domain image dataset includes, for each target class, at least one labeled target image and a plurality of unlabeled target images.

14. The storage medium according to claim 11, wherein:
the source domain image dataset includes a plurality of labeled source images in each source class.

15. The storage medium according to claim 11, wherein the feature class matching loss function is expressed by:

$$\mathcal{L}_{FCM} = \sum_{i=1}^{n} \|C_{\hat{y}_i} - x'_i\|_2^2$$

wherein $\hat{y}_i$ denotes a label corresponding to an i-th target feature vector; $C\hat{y}_i$ denotes a $\hat{y}_i$-th source feature class center; $x'_i$ denotes an i-th labeled target feature vector; and n is a number of labeled target images.

* * * * *